(12) United States Patent
Satou et al.

(10) Patent No.: US 9,922,677 B2
(45) Date of Patent: Mar. 20, 2018

(54) LIBRARY DEVICE, CARTRIDGE JUMP-OUT PREVENTING MECHANISM AND METHOD

(71) Applicant: NEC Platforms, Ltd., Kanagawa (JP)

(72) Inventors: Kazushi Satou, Kanagawa (JP); Shin Satou, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 0 days.

(21) Appl. No.: 15/464,625

(22) Filed: Mar. 21, 2017

(65) Prior Publication Data
US 2017/0278535 A1  Sep. 28, 2017

(30) Foreign Application Priority Data
Mar. 24, 2016 (JP) ................ 2016-060070

(51) Int. Cl.
*G11B 15/67* (2006.01)
*G11B 15/675* (2006.01)
*G11B 5/008* (2006.01)

(52) U.S. Cl.
CPC .... *G11B 15/67507* (2013.01); *G11B 5/00813* (2013.01)

(58) Field of Classification Search
CPC .............. G11B 15/67507; G11B 15/67; G11B 5/00813
USPC ...................... 360/92.1, 98.06, 93
See application file for complete search history.

(56) References Cited

U.S. PATENT DOCUMENTS

| | | | | |
|---|---|---|---|---|
| 5,576,911 A | * | 11/1996 | Porter | ................. G11B 17/22 360/92.1 |
| 5,646,926 A | * | 7/1997 | Handa | ................. G11B 17/041 720/636 |
| 8,503,129 B2 | | 8/2013 | Makino | |
| 2012/0250182 A1 | | 10/2012 | Makino | |

FOREIGN PATENT DOCUMENTS

| | | |
|---|---|---|
| JP | 06-71450 | 4/1986 |
| JP | 2012-216258 | 11/2012 |

* cited by examiner

*Primary Examiner* — Allen T Cao
(74) *Attorney, Agent, or Firm* — Young & Thompson (57) ABSTRACT

A library device includes: a housing for accommodating a magazine to be able to be put in and out, wherein the magazine has slots for accommodating recording medium cartridges to be able to be put in and out; an accessor for conveying the recording medium cartridge ejected from the slot to the magnetic tape drive; and a cartridge jump-out preventing mechanism for preventing the recording medium cartridge from jumping out to a moving path of the accessor. The cartridge jump-out preventing mechanism includes: an elastic pushing mechanism which can push the recording medium cartridge into the slot by using an elastic force when the magazine is inserted into the housing; and a latch mechanism which can hold the recording medium cartridge so that the recording medium cartridge does not jump out of the slot when the recording medium cartridge is completely accommodated in the slot.

20 Claims, 11 Drawing Sheets

FIG.2A
View along arrow X

View along arrow Y

View along arrow Z

LIBRARY DEVICE, CARTRIDGE JUMP-OUT PREVENTING MECHANISM AND METHOD

TECHNICAL FIELD

Reference to Related Application

The present invention is based upon and claims the benefit of the priority of Japanese patent application No. 2016-060070, filed on Mar. 24, 2016, the disclosure of which is incorporated herein in its entirety by reference thereto.

This invention relates to a library device, a cartridge jump-out preventing mechanism and a method.

BACKGROUND

There is a library device that accommodates a plurality of recording medium cartridges (for example, magnetic tape cartridges) and performs processing such as reading and writing of data from/onto a recording medium cartridge selected from the plurality of recording medium cartridges (see, for example, Patent literatures 1 and 2). In such a library device, a magazine is accommodated in a housing so as to be able to be put in and out, and a plurality of recording medium cartridges are accommodated in the magazine so as to be able to be put in and out. In addition, in the library device, when a recording medium cartridge is selected, the selected recording medium cartridge is ejected from the magazine, the ejected recording medium cartridge is conveyed to a recording medium driver, and processing such as data reading and writing is performed against the selected recording medium cartridge in the recording medium driver.

When loading the library device with the recording medium cartridge, a user first loads the magazine with the recording medium cartridge, and then loads the housing with the magazine loaded with the recording medium cartridge. When loading the housing with the magazine, there is a possibility that the recording medium cartridge loads the magazine in an incomplete state. At this occasion, when vibration or the like is added during loading, the recording medium cartridge may jump out of the magazine by a spring in the magazine after the magazine has been loaded in the housing. When the library device is used in a state where the recording medium cartridge has jumped out of the magazine in the housing, the jumped out recording medium cartridge comes into contact with the one (for example, an accessor, a cartridge tunnel) located inside the housing, and the selected recording medium cartridge cannot be ejected from the magazine. Also, when the recording medium cartridge stays in the housing in a state jumped out of the magazine, it is impossible to eject the magazine. Furthermore, when the recording medium cartridge completely drops out of the magazine in the housing, the magazine can be ejected, but the dropped out recording medium cartridge stays in the housing.

Therefore, in order to prevent a recording medium cartridge from jumping out of a magazine, a library device having a cartridge jump-out preventing mechanism for preventing a recording medium cartridge from jumping out of a magazine by using a stopper member (see, for example, Patent Literature 1) and a cartridge automatic exchanging device having a mechanism for pushing back a cartridge by using a tapered low friction member (see, for example, Patent Literature 2) have been proposed.

Patent Literature 1

JP Patent Kokai Publication No. JP2012-216258A

Patent Literature 2

JP Patent Kokai Publication No. JP-S61-071450A

SUMMARY

The following analysis is given by the present inventors.

In the library device described in Patent Literature 1, since the stopper function is temporarily canceled when the accessor passes through the place where the stopper member is disposed, there is a possibility that the medium cartridge jumps out by temporarily canceling the stopper function and the recording medium cartridge cannot be smoothly ejected or conveyed.

Further, in the cartridge automatic exchanging device described in Patent Literature 2, since the cartridge is allowed to jump out at a position where there is no tapered low friction member, when there is many the cartridge's jump-out at a position where there is no low friction member, there is a possibility that the cartridge cannot be ejected or conveyed smoothly.

There is a need in the art to provide a library device, a cartridge jump-out preventing mechanism and a method which can surely prevent the cartridge from jumping out of a magazine.

According to a first aspect, there is provided a library device. The library device comprises: a magazine having a plurality of slots for accommodating one or a plurality of recording medium cartridges to be able to be put in and out; a housing for accommodating the magazine to be able to be put in and out; a recording medium (e.g. magnetic tape) driver for reading or writing data of the recording medium cartridge; an accessor that is movable in a direction in which the plurality of slots are arranged and that conveys the recording medium cartridge ejected from the slot to the recording medium driver; and a cartridge jump-out preventing mechanism that prevents the recording medium cartridge from jumping out of the slot into a moving path of the accessor. The cartridge jump-out preventing mechanism comprises: an elastic pushing mechanism which can push the recording medium cartridge into the slot by using an elastic force until the recording medium cartridge is completely accommodated in the slot when the magazine is inserted into the housing; and a latch mechanism which is disposed in the magazine and can hold the recording medium cartridge so that the recording medium cartridge does not jump out of the slot when the recording medium cartridge is completely accommodated in the slot.

According to a second aspect, there is provided a cartridge jump-out preventing mechanism. The mechanism comprises: an elastic pushing mechanism which can push a recording medium cartridge into a slot of a magazine by using an elastic force until the recording medium cartridge is completely accommodated in the slot when the magazine, which is in a state where the recording medium cartridge is accommodated in the slot of the magazine, is being inserted into a housing; and a latch mechanism which can hold the recording medium cartridge so that the recording medium cartridge does not jump out of the slot when the recording medium cartridge is completely accommodated in the slot.

According to a third aspect, there is provided a method for preventing cartridge jumping out. The method comprises; pushing a recording medium cartridge into a slot of a magazine by using an elastic force until the recording medium cartridge is completely accommodated in the slot when the magazine, which is in a state where the recording medium cartridge is accommodated in the slot of the magazine, is being inserted into a housing; and holding the recording medium cartridge so that the recording medium cartridge does not jump out of the slot when the recording medium cartridge is completely accommodated in the slot.

According to the first to third aspects, it is possible to surely prevent the cartridge from jumping out of the magazine.

BRIEF DESCRIPTION OF THE DRAWINGS

FIGS. 1A and 1B are plan views schematically showing a configuration of a library device according to exemplary embodiment 1, wherein FIG. 1A is a figure while loading a magazine, and FIG. 1B is a figure after loading a magazine.

FIGS. 2A and 2B are partial side views taken along an arrow X in FIG. 1A schematically showing a configuration of a library device according to exemplary embodiment 1, wherein FIG. 2A is a figure while loading a magazine, and FIG. 2B is a figure after loading the magazine.

FIGS. 3A and 3B are figures schematically showing a configuration of an elastic pushing mechanism of a library device according to exemplary embodiment 2, wherein FIG. 3A is a plan view and FIG. 3B is a side view taken along an arrow Y.

FIGS. 4A and 4B are plan views schematically showing a configuration of a library device according to exemplary embodiment 2, wherein FIG. 4A is a figure while loading a magazine is, and FIG. 4B is a figure after loading the magazine.

FIGS. 8A and 8B are figures schematically showing a configuration of an elastic pushing mechanism of a library device according to exemplary embodiment 3, wherein FIG. 8A is a plan view, and FIG. 8B is a side view taken along an arrow Z.

FIGS. 9A and 9B are figures schematically showing motions of an elastic pushing mechanism when loading a magazine of a library device according to exemplary embodiment 3, wherein FIG. 9A is a figure when a recording medium cartridge jumps out, and FIG. 9B is a figure after pushing a recording medium cartridge.

FIGS. 10A and 10B are figures schematically showing motions of a library device according to exemplary embodiment 3 when ejecting a magazine, wherein FIG. 10A is a figure before a pushing release of an elastic pushing mechanism, and FIG. 10B is a figure after a pushing release of the elastic pushing mechanism.

PREFERRED MODES

Hereinafter, embodiments are described with reference to the drawings. It is to be noted that, in the case that drawings reference numerals are attached the in the present application, they are exclusively to aid understanding and are not intended to be limited to the illustrated embodiment(s).

Exemplary Embodiment 1

Figure 1A:
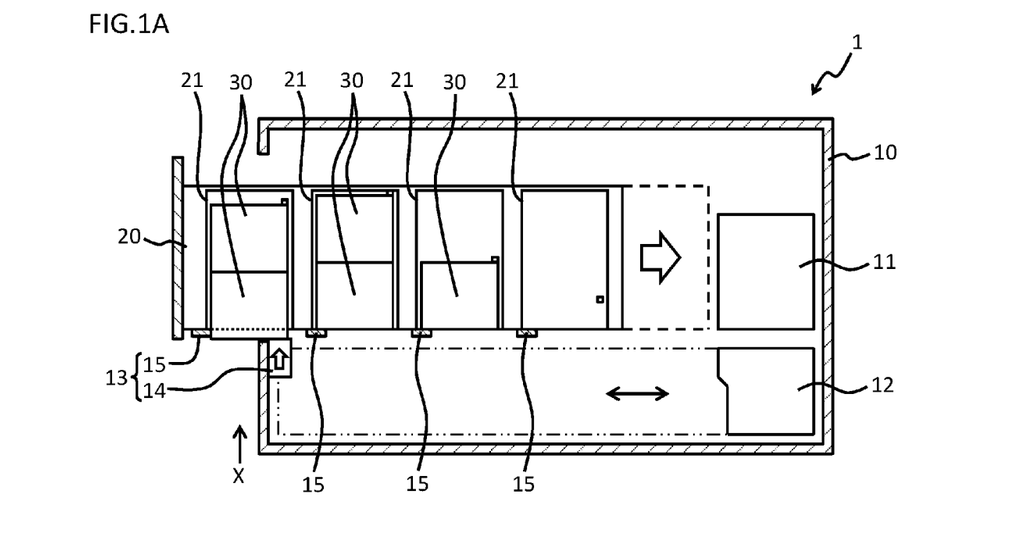
Figure 1B:
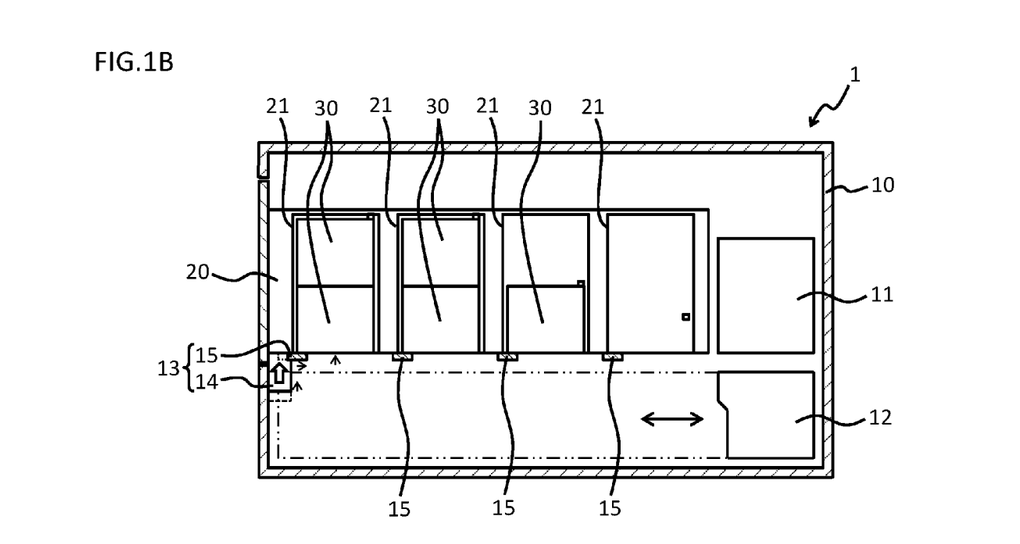
Figure 2A:
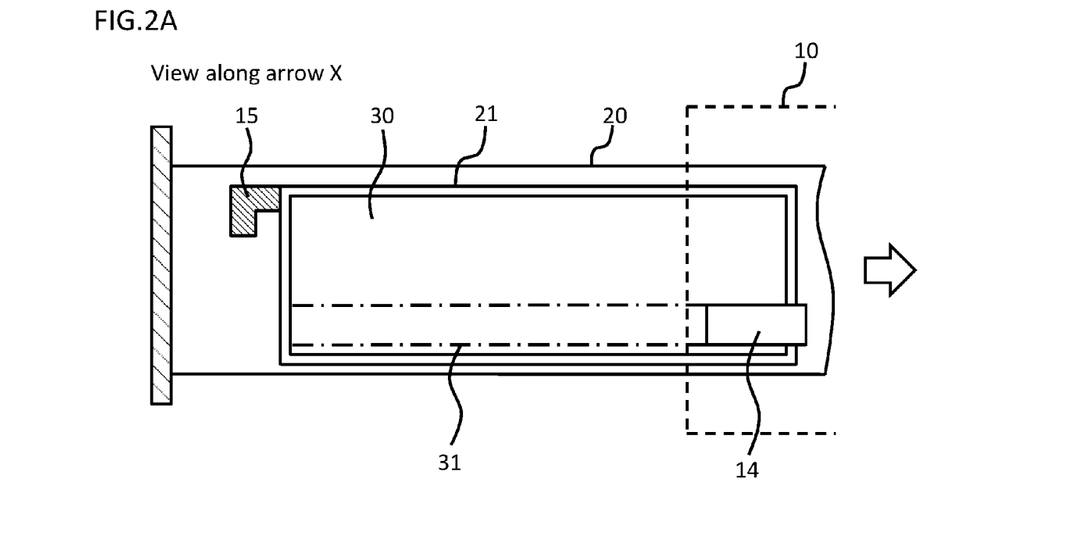
Figure 2B:
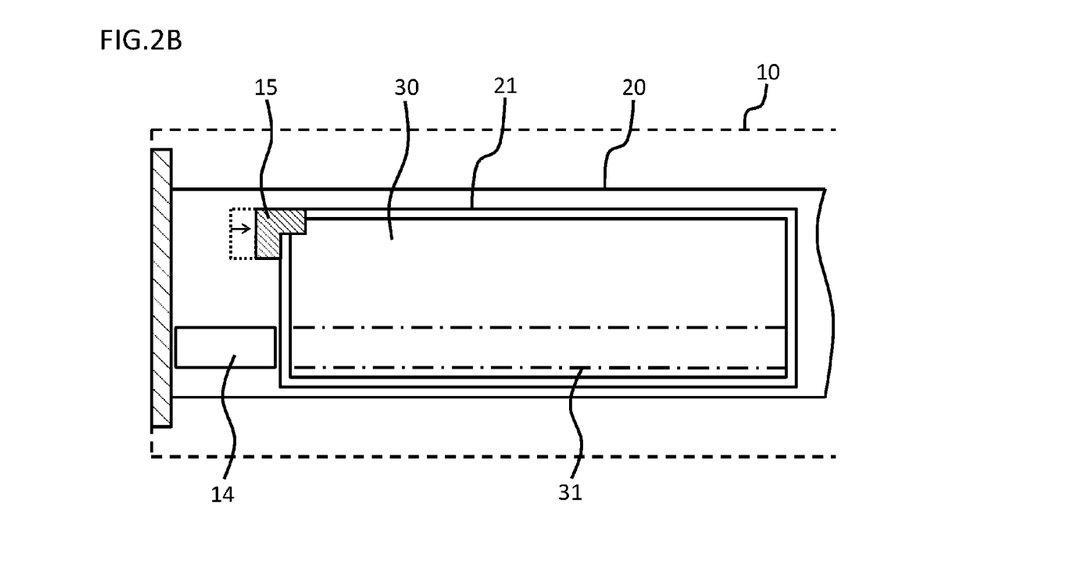

A library device according to exemplary embodiment 1 is explained using drawings. FIGS. 1A and 1B are plan views schematically showing a configuration of a library device according to exemplary embodiment 1, wherein FIG. 1A is a figure while loading a magazine, and FIG. 1B is a figure after loading the magazine. FIGS. 2A and 2B are partial side views taken along an arrow X in FIG. 1A schematically showing a configuration of a library device according to exemplary embodiment 1, wherein FIG. 2A is a figure while loading a magazine, and FIG. 2B is a figure after loading the magazine.

The library device 1 is a device that accommodates a plurality of recording medium cartridges 30 and performs processing such as reading, writing and the like of data to a recording medium cartridge selected from among the plurality of recording medium cartridges 30. The library device 1 comprises a magazine 20, a housing 10, a recording medium driver 11, an accessor 12 and a cartridge jump-out preventing mechanism 13.

The magazine 20 has a plurality of slots 21 that accommodate a plurality of recording medium cartridges 30 (it may be one) so as to be able to put in and out. The housing 10 accommodates the magazine 20 so as to be able to put in and take out (may be termed "put in and out" or "take in and out"). The recording medium driver 11 reads or writes data of the recording medium cartridge 30. The accessor 12 is movable in a direction along which a plurality of slots 21 are arranged. The accessor 12 conveys the recording medium cartridge 30 ejected from the slot 21 to the recording medium driver 11.

The cartridge jump-out preventing mechanism 13 prevents the recording medium cartridge 30 from jumping out of the slot 21 to a moving path of the accessor 12. The cartridge jump-out preventing mechanism 13 comprises an elastic pushing mechanism 14 and a latch mechanism 15 (including latch members 15).

The elastic pushing-in mechanism 14 is a mechanism that can push the recording medium cartridge 30 into the slot 21 by using an elastic force until the recording medium cartridge 30 is completely accommodated in the slot 21 when inserting the magazine 20 into the housing 10 (see FIGS. 1A and 2A).

The latch mechanism 15 is disposed in the magazine 20. The latch mechanism 15 is a mechanism that can latch the recording medium cartridge 30 so that the recording medium cartridge 30 does not jump out of the slot 21 when the recording medium cartridge 30 is completely accommodated in the slot 21 (see FIGS. 1B and 2B).

In the operation of the library device 1 when loading the magazine (method of preventing cartridge jumping out), first, when inserting the magazine 20, which is in the state where the recording medium cartridge 30 is accommodated in the slot 21 of the magazine 20, into the housing 10, until the recording medium cartridge 30 is completely accommodated in the slot 21, the recording medium cartridge 30 is pushed into the slot 21 by using elastic force (see FIGS. 1A and 2A).

Next, when the recording medium cartridge 30 is completely accommodated in the slot 21, the recording medium cartridge 30 is latched by the latch mechanism 15 of the magazine 20 so that the recording medium cartridge 30 does not jump out of the slot 21 (FIGS. 1B and 2B).

According to exemplary embodiment 1, when loading the magazine, by pushing the recording medium cartridge 30 due to the elastic force until the recording medium cartridge 30 is completely accommodated in the slot 21 and latching the recording medium cartridge 30 by the latch mechanism 15 so that the recording medium cartridge 30 is prevented from jumping out of the slot 21, it is possible to reliably prevent the recording medium cartridge 30 from jumping out of the magazine 20.

Exemplary Embodiment 2

Figure 3A:
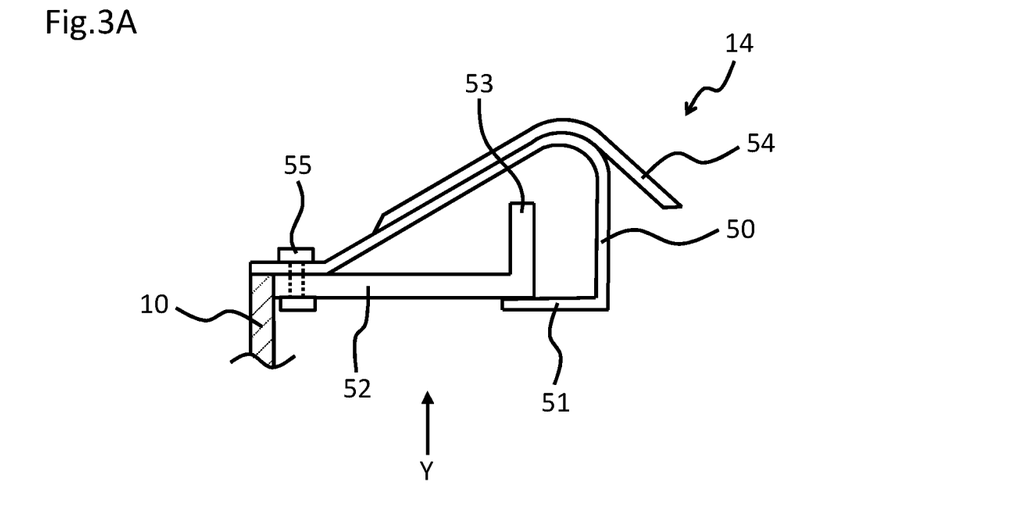
Figure 3B:
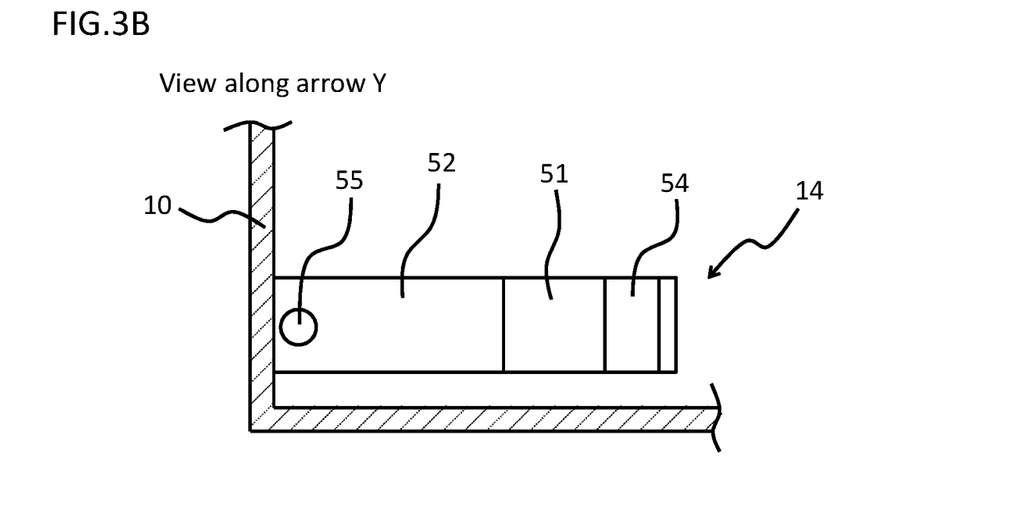
Figure 4A:
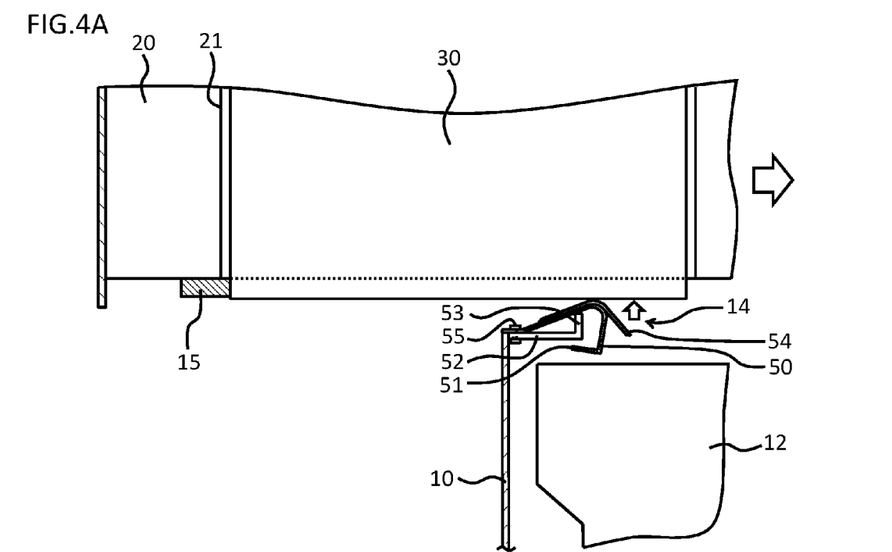
Figure 4B:
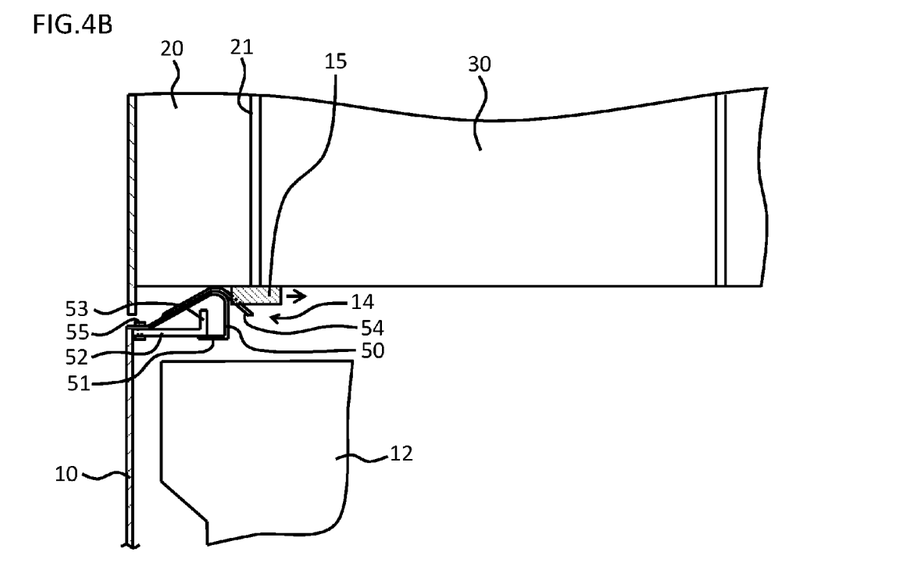
Figure 5:
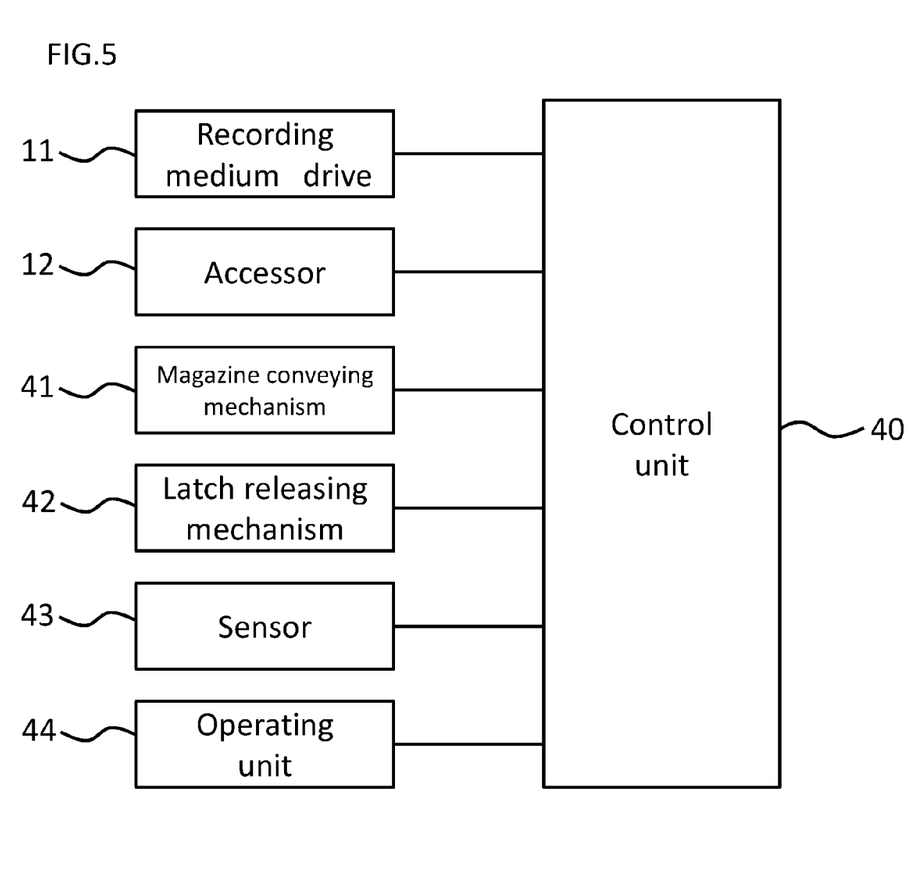
FIG. 5 is a block diagram schematically showing a configuration of a control system of a library device according to exemplary embodiment 2.
Figure 6:
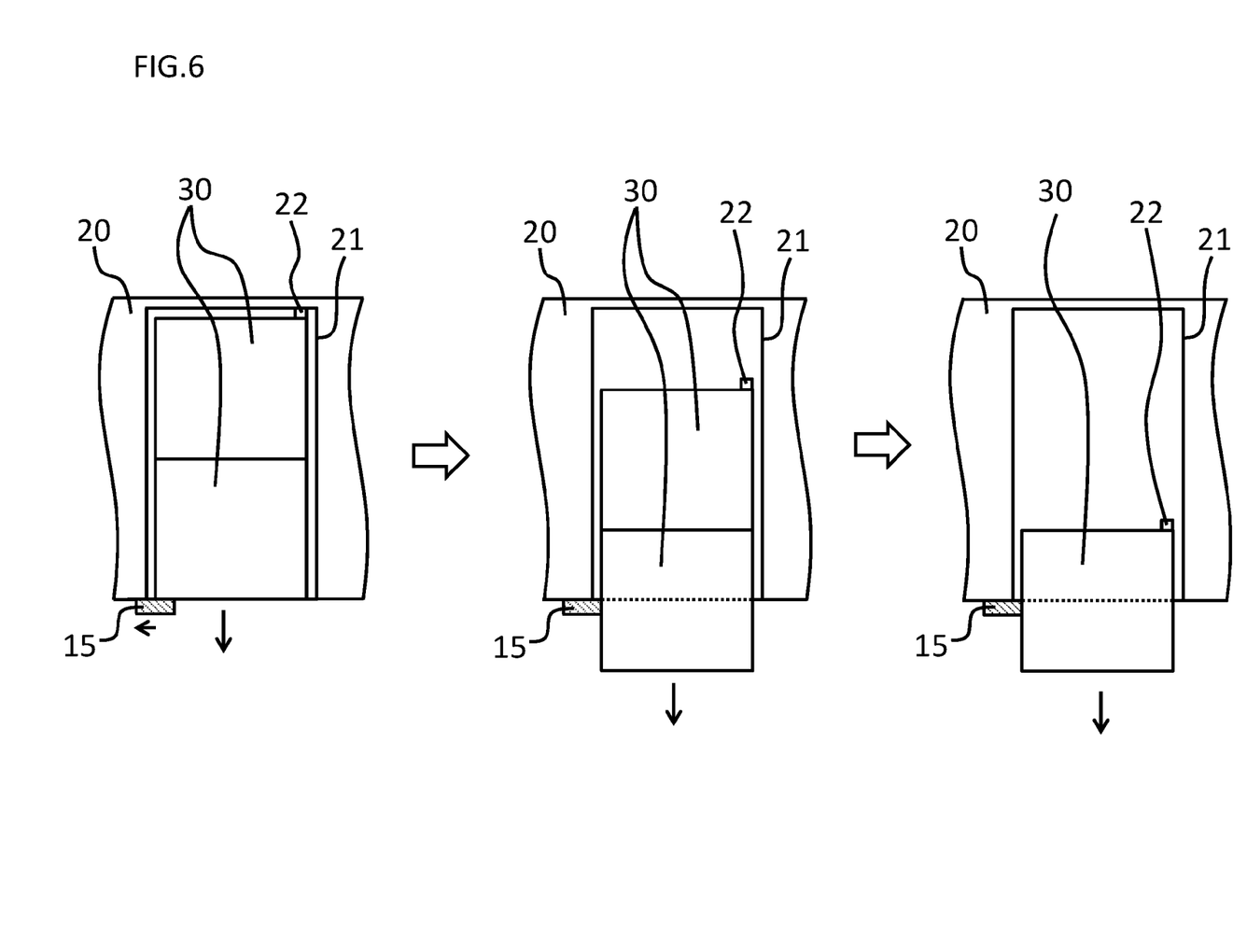
FIG. 6 is a figure for explaining a function of a spring member in a magazine of a library device according to exemplary embodiment 2.

A library device according to exemplary embodiment 2 is explained using drawings. FIGS. 3A and 3B are figures schematically showing a configuration of an elastic pushing mechanism of a library device according to exemplary embodiment 2, wherein FIG. 3A is a plan view and FIG. 3B is a side view taken along an arrow Y. FIGS. 4A and 4B are plan views schematically showing a configuration of the library device according to exemplary embodiment 2, wherein FIG. 4A is a figure while loading a magazine is, and FIG. 4B is a figure after loading a magazine. FIG. 5 is a block diagram schematically showing a configuration of a control system of a library device according to exemplary embodiment 2. FIG. 6 is a figure for explaining a function of a spring member in a magazine of a library device according to exemplary embodiment 2.

In exemplary embodiment 2, a plate spring 50 (see FIGS. 3A and 3B) is used for the elastic pushing mechanism (14 in FIGS. 1A and 1B) of the library device (1 in FIGS. 1A and 1B) according to exemplary embodiment 1. In the library device according to exemplary embodiment 2, please see FIGS. 1A, 1B, 2A and 2B together.

The library device 1 is a device that accommodates a plurality of recording medium cartridges 30 and performs processing such as reading, writing and the like of data from/to a recording medium cartridge selected from among the plurality of recording medium cartridges 30 (see FIGS. 1A and 1B). The library device 1 comprises a housing 10, a magazine 20, a recording medium driver 11, an accessor 12 and a cartridge jump-out preventing mechanism 13.

The housing 10 is a box-like member that accommodates the magazine 20 so as to be able to put in and out (see FIGS. 1A and 1B). The housing 10 mounts a recording medium driver 11, an accessor 12, a cartridge jump-out preventing mechanism 13, a control unit 40, a magazine conveying mechanism 41, a latch releasing mechanism 42, a sensor 43, and an operating unit 44 (see FIGS. 1A, 1B and 5). The housing 10 has an inlet/outlet (may be termed as "in/out-let") for the magazine 20.

The recording medium driver 11 is a functional unit that reads or writes data of the recording medium cartridge 30 (see FIGS. 1A and 1B). The recording medium driver 11 has a function of receiving the recording medium cartridge 30 from the accessor 12 and has a function of ejecting the recording medium cartridge 30 toward the accessor 12. The motion of the recording medium driver 11 is controlled by the control unit 40 (see FIG. 5).

The accessor 12 is a functional unit that can move in a direction along which a plurality of slots 21 are arranged (see FIGS. 1A and 1B). The accessor 12 has a function of receiving the recording medium cartridges(s) 30 ejected from the slot(s) 21, and has a function of conveying the received recording medium cartridge(s) 30 to the recording medium driver 11, and has a function of ejecting a recording medium cartridge(s) 30 toward the recording medium driver 11. The motion of the accessor 12 is controlled by the control unit 40 (see FIG. 5).

The cartridge jump-out preventing mechanism 13 is a mechanism that prevents the recording medium cartridge 30 from jumping out of the slot 21 into the moving path of the accessor 12 (see FIGS. 1A and 1B). The cartridge jump-out preventing mechanism 13 comprises an elastic pushing mechanism 14 and a latch mechanism 15.

The elastic (resilient) pushing mechanism 14 is a mechanism that can push the recording medium cartridge 30 into the slot 21 by using elastic force until the recording medium cartridge 30 is completely accommodated in the slot 21 upon (or during) inserting the magazine 20 into the housing 10 (see FIGS. 1A, 2A and 4A). The elastic pushing mechanism 14 is disposed at an in/out-let of the magazine 20 in the housing 10. The elastic pushing mechanism 14 is set to have a size and height so as not to contact with the latch mechanism 15, a label (attached to the recording medium cartridge 30; not shown), etc., and can contact (slide) with the recording medium cartridge 30 in a push contact region 31. The elastic pushing mechanism 14 has a plate spring 50, a hook 51, a stopper 52, a protrusion 53, a lining member 54 and a rivet 55 (see FIG. 3).

The plate spring 50 is a plate-like spring formed in a predetermined shape. The plate spring 50 can push the recording medium cartridge(s) 30 into the slot(s) 21 until the recording medium cartridge(s) 30 is completely accommodated in the slot(s) 21 when inserting the magazine 20 into the housing 10 (see FIGS. 4A and 4B). The plate spring 50 is fixed to the stopper 52 (it may be the housing 10) by rivet 55. The plate spring 50 is elastically deformable in a direction along which the recording medium cartridge 30 jumps out, and biases the recording medium cartridge 30 in a direction to push the recording medium cartridge 30 into the slot 21. A biasing (energizing) force of the plate spring 50 is larger than an energizing force of the spring member 22 for ejecting the recording medium cartridge 30 from the slot 21. A biasing direction of the plate spring 50 is opposite to a biasing direction of the spring member 22. The plate spring 50 can be caught (or stopped) by a protrusion 53 of the stopper 52 so as not to enter the moving path of the accessor 12, when elastically deformed by jumping-out of the recording medium cartridge 30 (see FIG. 4A). The plate spring 50 has a hook 51 that can be caught (or engaged) by the stopper 52 so as not to push the recording medium cartridge 30 excessively into the slot 21 (see FIG. 4B). Note, however, the plate spring 50 may be in other shape as long as the same basic function is achieved.

The stopper 52 is a member for regulating a motion range of the plate spring 50. The stopper 52 is fixed to the housing 10. The stopper 52 may be integral with the housing 10. The stopper 52 has a protrusion 53 for regulating deformation of the plate spring 50 so as not to contact with the accessor 12 (see FIG. 4A). The stopper 52 locks movement of the hook 51 of the plate spring 50 so that the plate spring 50 does not push the recording medium cartridge 30 excessively into the slot 21 (see FIG. 4B). The protrusion 53 may be formed, e.g. as a curved or bent protrusion preferably at the remote end of the stopper 52. The bent protrusion may be preferably bent (generally in an "L" form) at right angles from the major part of the stopper 52. The hook 51 may be formed by a curved and bent configuration with an end bent portion of the spring member (e.g. plate spring) 50. The hook 51 end extends generally backward toward the fixing base part (rivet 55) of the stopper 52 to reach engagement with the end part (bent part) of the stopper at the bottom side opposite to the protrusion 53. The curved portion of the spring member 51 generally extends downward exceeding the protrusion 53 to an area below/beneath the remote end (bent end) of the stopper 52. Due to this configuration, the plate spring 50 can move elastically within a specified range, i.e. between a first position defined by the hooked state of the hook 51 at the bottom of the stopper 52 and a second position defined by the protrusion of the stopper 52 (FIG. 4B).

A lining member 54 is a member for smoothly sliding the moving recording medium cartridge 30 when it is pressed by the plate spring 50. The lining member 54 is fixed (adhered, etc.) to the surface on the side of the recording medium cartridge 30 in the plate spring 50. As the lining member 54, a material (abrasion resistant material) having a smaller friction coefficient than a material used for the plate spring 50 can be used, and for example, an engineering plastic such as a fluorine resin can be used.

The rivet 55 is a member for fixing the plate spring 50 to the stopper 52.

The latch mechanism 15 is a mechanism that can latch the recording medium cartridge 30 so that the recording medium cartridge 30 does not jump out of the slot 21, when the recording medium cartridge 30 is completely accommodated in the slot 21 (see FIGS. 1B, 2B and 4B). The latch mechanism 15 is disposed in the magazine 20. The latch mechanism 15 can release the latch manually, when the recording medium cartridge 30 is put in and out of the slot 21 in the housing 10. In addition, the latch mechanism 15 can release the latch by a latch releasing mechanism 42 when the recording medium cartridge 30 is put in and out of the slot 21 within the housing 10.

The magazine 20 is a box-like member for accommodating a plurality of recording medium cartridges 30 together in the housing 10. The magazine 20 has a plurality of slots 21 that accommodate one or a plurality of recording medium cartridges 30 so as to be able to put in and out. In one slot 21, one or two recording medium cartridges 30 (they may be three or more) can be accommodated in series. The magazine 20 has a spring member 22 for pressing the recording medium cartridge 30 accommodated in the slot 21 toward the in/out-let (see FIG. 6). The spring member 22 pushes out the front and rear recording medium cartridges 30 when the latch of the latch mechanism 15 is released in a state where the recording medium cartridge 30 is accommodated in the slot 21, and pushes out the rear recording medium cartridge 30 when the front recording medium cartridge 30 is pushed out completely. The energizing force of the spring member 22 is smaller than the energizing force of the plate spring 50. The energizing direction of the spring member 22 is opposite to the energizing direction of the plate spring 50.

The recording medium cartridge 30 is a cartridge in which a recording medium, for example, one wound around a reel (not shown) is accommodated. The recording medium cartridge 30 is accommodated in the slot 21 of the magazine 20, to be accommodated in the housing 10. The recording medium cartridge 30 can be put in and out of the slot 21. The recording medium cartridge 30 can be conveyed by the accessor 12. Data of the recording medium cartridge 30 can be read or written by the recording medium driver 11.

The library device 1 has a control unit 40, a recording medium driver 11, an accessor 12, a magazine conveying mechanism 41, a latch releasing mechanism 42, a sensor 43 and an operating unit 44, in a control system (see FIG. 5). The recording medium driver 11 and the accessor 12 are as described above.

The control unit 40 is a functional unit that controls motion of the recording medium driver 11, the accessor 12, the magazine conveying mechanism 41 and the latch releasing mechanism 42. As the control unit 40, for example, a semiconductor integrated circuit or the like can be used. The control unit 40 is electrically connected to the sensor 43 and the operating unit 44.

The control unit 40 controls motion of the magazine conveying mechanism 41 so as to load or eject the magazine 20 when loading or ejecting of the magazine 20 is operated by the operating unit 44. The control unit 40 controls so as to stop a motion of the magazine conveying mechanism 41, when the magazine 20 is loaded or ejected by the magazine conveying mechanism 41 and the sensor 43 detects that loading or ejecting of the magazine 20 has been completed.

The magazine conveying mechanism 41 is a mechanism for conveying (loading or ejecting) the magazine 20 in the housing 10. Motion of the magazine conveying mechanism 41 is controlled by the control unit 40.

The latch releasing mechanism 42 is a mechanism for releasing a latching of the latch mechanism 15 when ejecting the recording medium cartridge 30 from the slot 21 to the accessor 12. Motion of the latch releasing mechanism 42 is controlled by the control unit 40.

The sensor 43 is a functional unit that monitors loading or ejecting of the magazine 20. As the sensor 43, for example, a light sensor (e.g. opt-electric sensor) or the like can be used. The sensor 43 is electrically connected to the control unit 40.

The operating unit 44 is a functional unit for operating motion of the library device 1. The operating unit 44 has a function for operating loading or ejecting of the magazine 20 with respect to the housing 10. As the operating unit 44, for example, a switch button, a touch panel, or the like can be used. The operating unit 44 is electrically connected to the control unit 40.

Figure 7:
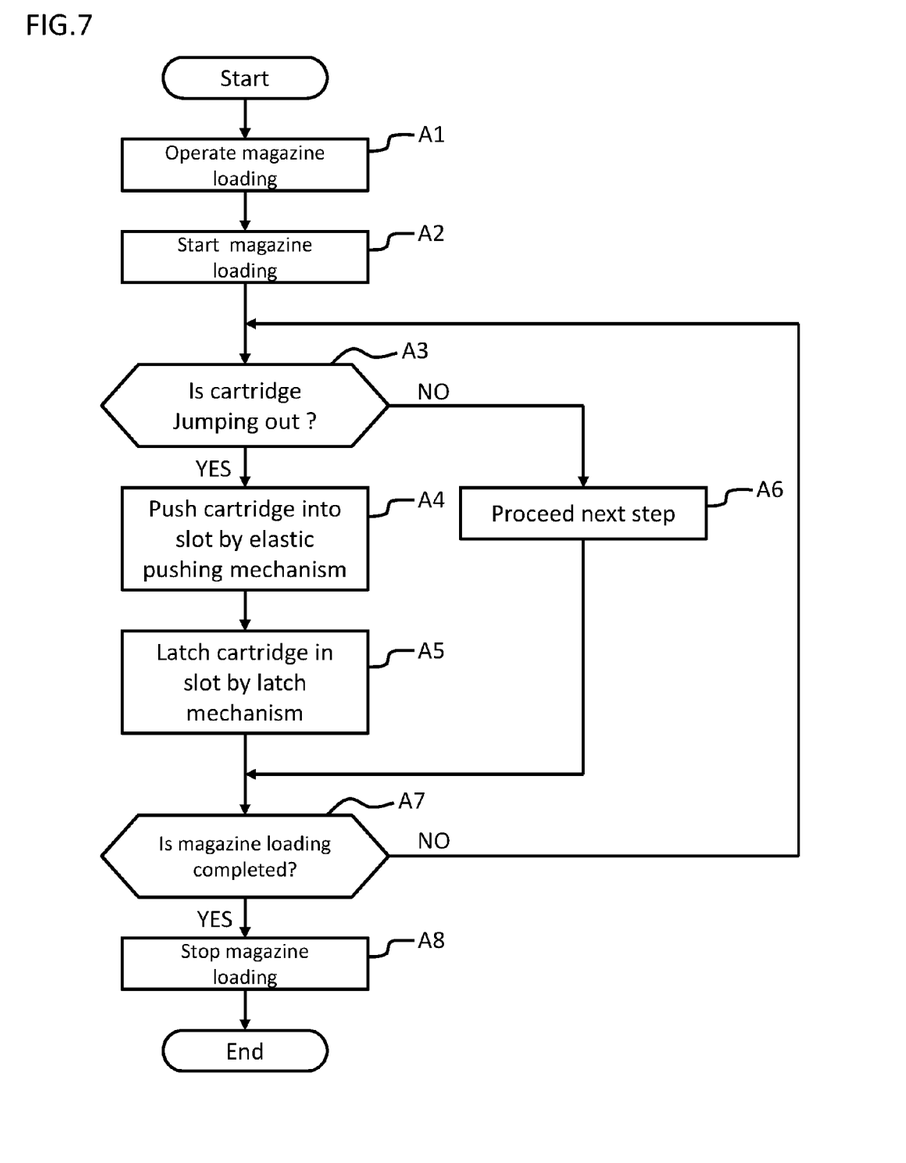
FIG. 7 is a flow chart schematically showing motions when loading a magazine of a library device according to exemplary embodiment 2.

Next, motions of the library device according to exemplary embodiment 2 when loading the magazine are explained using drawings. FIG. 7 is a flow chart schematically showing motions when loading a magazine of a library device according to exemplary embodiment 2. As to configurations of the library device 1, please see FIGS. 1A to 6.

First, the magazine 20 accommodating the recording medium cartridge 30 is set at the in/out-let of the housing 10, and the library device 1 receives restrictions of a magazine loading operation from the operating unit 44 by a user's operation (for example, pushing operation of the magazine 20, switch operation) (Step A1).

After Step A1, the library device 1 starts loading of the magazine 20 accommodating the recording medium cartridge 30 into the housing 10 by starting a loading motion of the magazine conveying mechanism 41 (Step A2).

After Step A 2 or when the loading of the magazine 20 is not completed (NO of Step A7), the library device 1 confirms whether or not the recording medium cartridge 30 is at jumping out from the slot 21 of the magazine 20 by the elastic pushing mechanism 14, while the magazine 20 is loaded in the housing 10 (Step A3). When the recording medium cartridge 30 is not at jumping out (NO in Step A3), proceed to step A 6.

When the recording medium cartridge 30 is at jumping out (YES in Step A3), the library device 1 pushes the recording medium cartridge 30 to the slot of the magazine 20 by the elastic pushing mechanism 14 until the recording medium cartridge 30 is completely accommodated in the slot 21 (Step A4; see FIGS. 1A, 2A and 4A).

After Step A4, the library device 1 latches the recording medium cartridge 30 by the latch mechanism 15 of the magazine 20 so that the recording medium cartridge 30 does not jump out of the slot 21, when the recording medium cartridge 30 is completely accommodated in the slot 21 (Step A5; FIG. 1B, FIG. 2B, FIG. 4B).

When the recording medium cartridge 30 is not at jumping out (NO in Step A3), the library device 1 proceeds next step not to push the recording medium cartridge 30 into the slot 21 of the magazine 20 by the elastic pushing mechanism 14 (Step A6).

After Step A5 or Step A6, the library device 1 confirms whether or not the loading of the magazine 20 into the housing 10 is completed by using the sensor 43 (Step A7). When the loading of the magazine 20 is not completed (NO in Step A7), return to Step A3.

When the loading of the magazine 20 is completed (YES in Step A7), the library device 1 stops the loading of the magazine 20 accommodating the recording medium cartridge 30 into the housing 10 by stopping the loading motion of the magazine conveying mechanism 41 (Step A8), and then comes to end.

According to exemplary embodiment 2, even when the magazine 20 is loaded in the housing 10 in a state where the recording medium cartridge 30 does not jump out of the magazine 20 and the latch mechanism 15 is at an incomplete state, it is possible reliably to prevent the recording medium cartridge 30 from jumping out of the magazine 20. That is, when the magazine 20 is loaded in the housing 10, since the recording medium cartridge 30 is completely pushed into the slot 21 by the elastic pushing mechanism 14, and the recording medium cartridge 30 is latched in the slot 21 by the latch mechanism 15, it is possible to reliably prevent the recording medium cartridge 30 from jumping out of the magazine 20.

Exemplary Embodiment 3

Figure 8A:
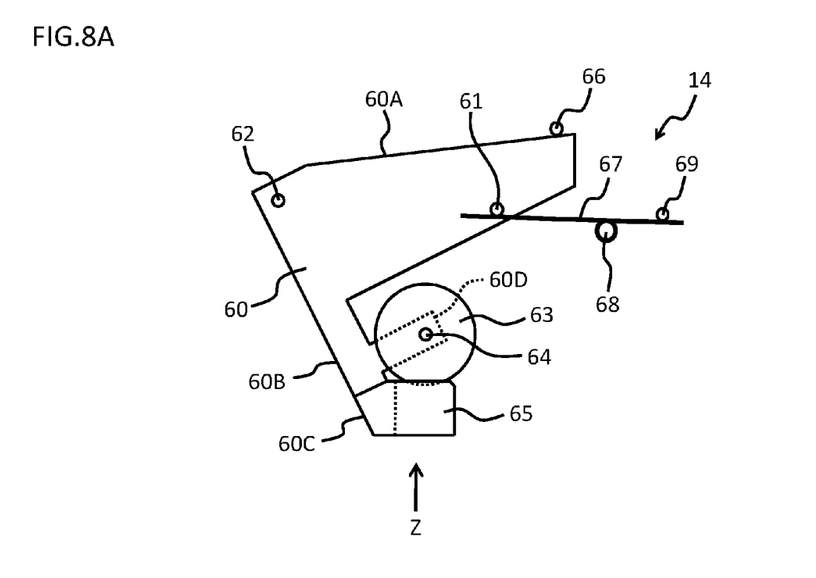
Figure 8B:
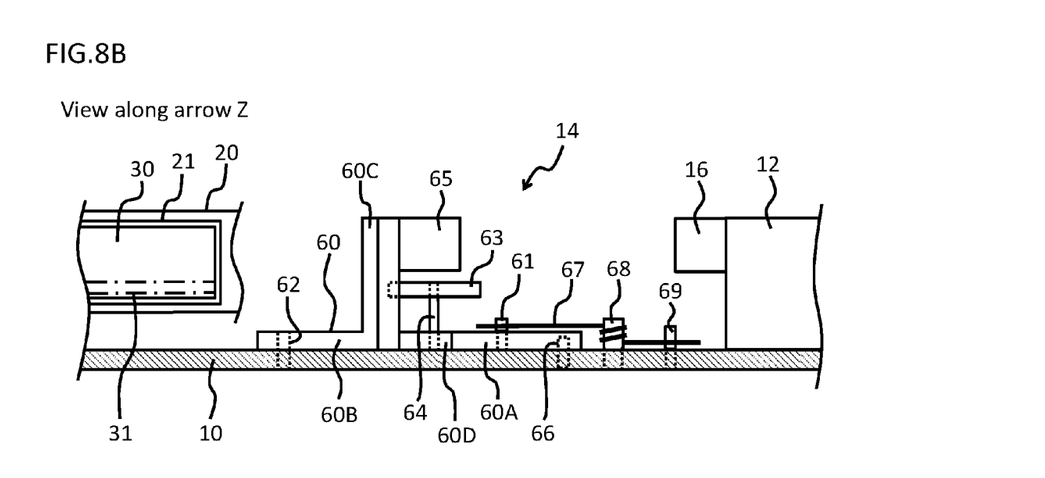
Figure 9A:
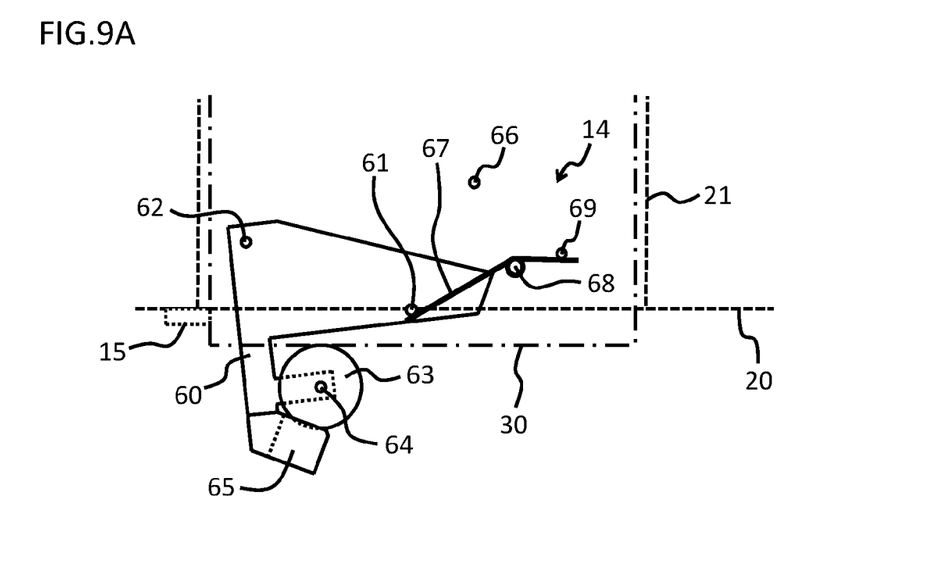
Figure 9B:
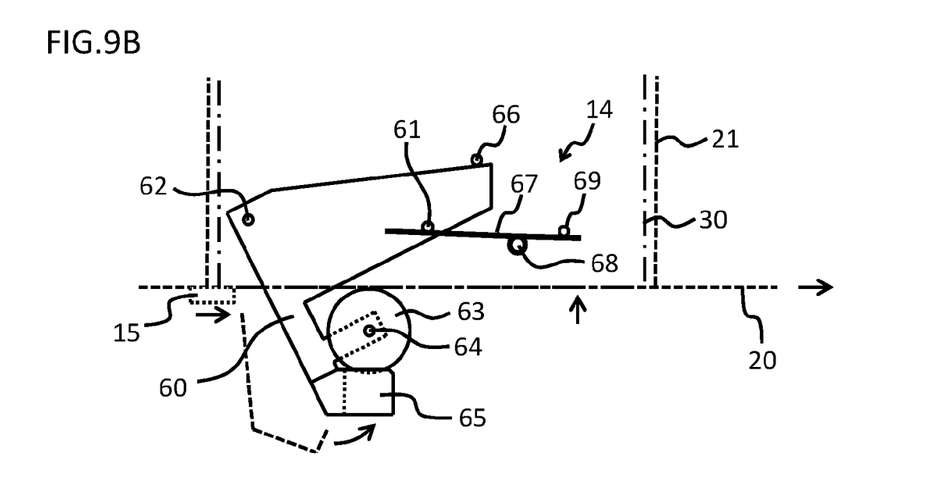
Figure 10A:
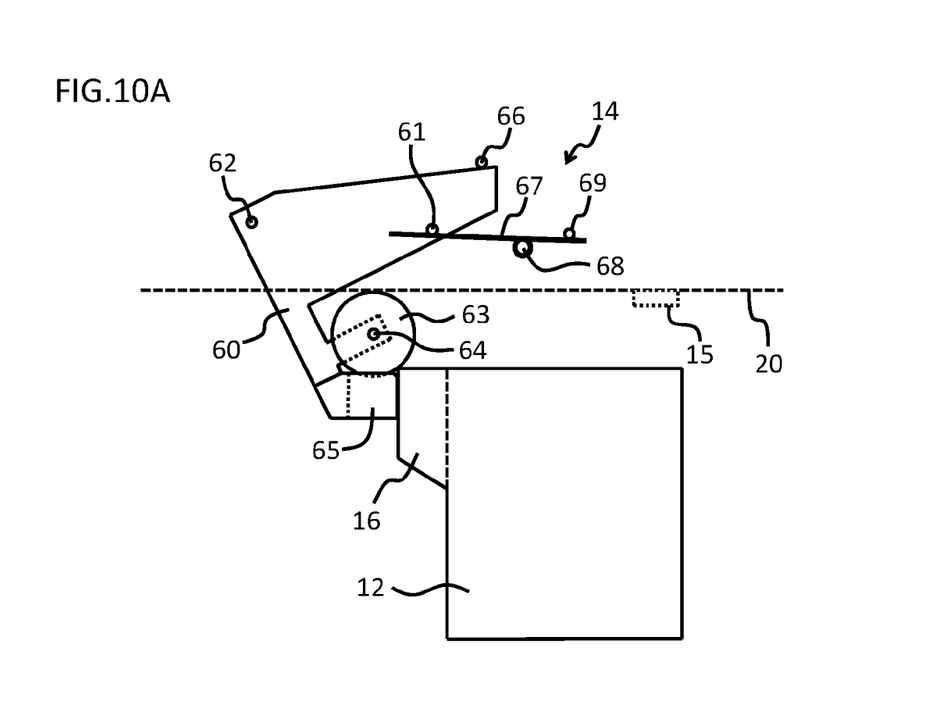
Figure 10B:
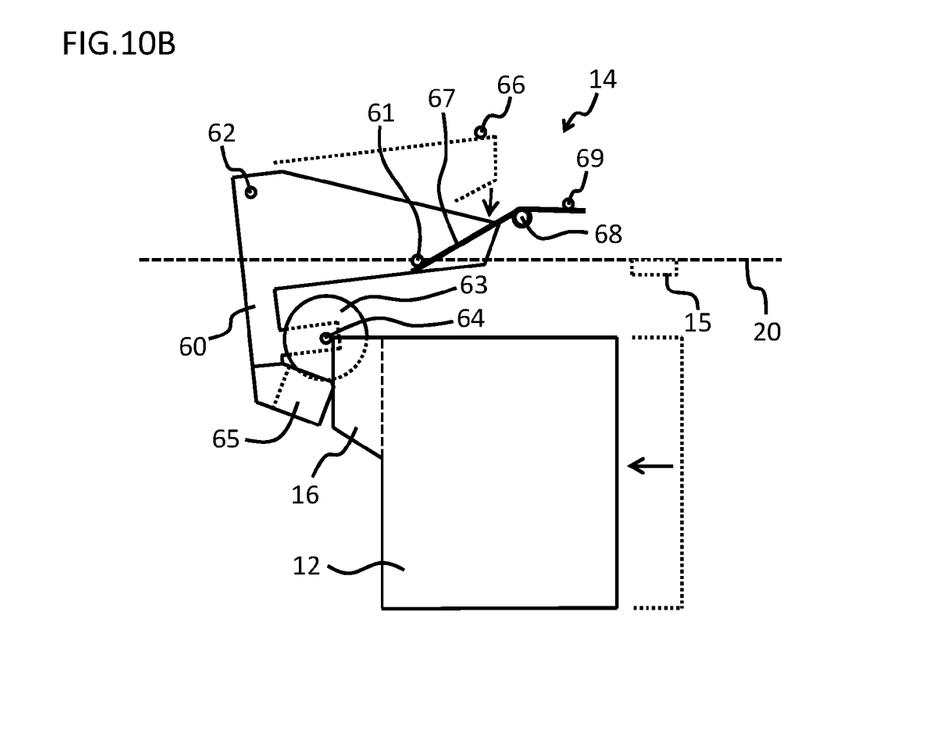

A library device according to exemplary embodiment 3 is explained using drawings. FIGS. 8A and 8B are figures schematically showing a configuration of an elastic pushing mechanism of a library device according to exemplary embodiment 3, wherein FIG. 8A is a plan view, and FIG. 8B is a side view taken along an arrow Z. FIGS. 9A and 9B are figures schematically showing motions of an elastic pushing mechanism when loading a magazine of a library device according to exemplary embodiment 3, wherein FIG. 9A is a figure when a recording medium cartridge jumps out, and FIG. 9B is a figure after pushing a recording medium cartridge. FIGS. 10A and 10B are figures schematically showing motions of a library device according to exemplary embodiment 3 when ejecting a magazine, wherein FIG. 10A is a figure before pushing release of an elastic pushing mechanism, and FIG. 10B is a figure after pushing release of the elastic pushing mechanism.

Exemplary embodiment 3 is a mode using an arm member 60, a roller 63 and a spring member 67 for the elastic pushing mechanism (14 in FIGS. 1A and 1B) of the library device (1 in FIGS. 1A and 1B) according to exemplary embodiment 1. In the library device according to exemplary embodiment 3, please see FIGS. 1A, 1B, 2A and 2B together. Exemplary embodiment 3 is similar to configurations and motions of exemplary embodiment 2 except for configurations of the elastic pushing mechanism 14 and a magazine ejecting motion. Further, as for a control system of exemplary embodiment 3, please see FIG. 5.

The elastic pushing mechanism 14 is a mechanism that can push the recording medium cartridge 30 into the slot 21 by using elastic force until the recording medium cartridge 30 is completely accommodated in the slot 21, when inserting the magazine 20 into the housing 10 (see FIGS. 1A, 2A and 9A). The elastic pushing mechanism 14 is set so as not to interfere with the recording medium cartridge 30 and the magazine 20 except for the roller 63. The elastic pushing mechanism 14 is set so as not to contact with the accessor 12 except for the contact portion 65 of the arm member 60. The elastic pushing mechanism 14 comprises an arm member 60, a force point portion 61, a fulcrum pivot axis portion 62, a roller 63, an action point shaft portion 64, a stopper 66, a spring member 67, a spring supporting portion 68 and a spring rotation stopping portion 69 (see FIGS. 8A and 8B).

The arm member 60 is a member rotatably (pivotably) supported to the housing 10 so that the fulcrum pivot axis portion 62 constitutes a fulcrum. The arm member 60 has a force point portion 61 which receives a biasing force of the spring member 67 at a predetermined position away from the fulcrum pivot axis portion 62. The force point portion 61 is a protrusion fixed to the arm member 60 (main arm 60A), and is urged to rotate (counterclockwise when viewed in FIG. 8A) the arm member 60 by receiving the biasing force of the spring member 67. The fulcrum pivot axis portion 62 is fixed to the housing 10 and pivotably supports the arm member 60 so that the arm member 60 does not move away in the axial direction. The arm member 60 has a contact portion 65 capable of contacting against a protrusion 16 of the accessor 12. The contact portion 65 is set (arranged) so as not to contact with the roller 63. The arm member 60 has generally a main arm 60A and a side arm 60B extending from the foot (one end) portion of the main arm at which the fulcrum pivot axis portion 62 is disposed intersecting at an angle (e.g. at right angles) with the main arm. The side arm 60B has an extension portion 60C which forms the contact portion 65, at remote end of the extension portion 60C. Also, the side arm 60B has a branch 60D at an intermediate of the side arm 60B. The branch 60D supports the action point shaft portion 64. It is noted however, general shape of the arm member 60 may be configured in any other shape, as long as its required functions can be satisfied.

The roller 63 is a rotating member that can rotate in contact with the recording medium cartridge 30. The roller 63 is rotatably supported to the arm member 60 so that the action point shaft portion 64 constitutes a shaft. The roller 63 is disposed so as not to contact with the contact portion 65 of the arm member 60. The roller 63, when the magazine 20 is moved in the housing 10 during loading of the magazine, is rotated while pressing against the recording medium cartridge 30 by the biasing force of the spring member 67 received via the arm member 60, and pushes the recording medium cartridge 30 into a latch-complete position in the magazine 20. The position of the roller 63 can be changed depending on (or responsive to) the position of the accessor 12. The roller 63 is set to a size and a height not to contact with the latch mechanism 15 and the label portion of the magazine 20. The action point shaft portion 64 is fixed to the arm member 60 and rotatably supports the roller 63 so that the roller 63 does not come away in the axial direction. The action point shaft portion 64 is disposed at a predetermined position away from the force point portion 61 and the fulcrum pivot axis portion 62 in the arm member 60.

The stopper 66 is a protrusion-like member that regulates (restricts) a motion range of the arm member 60 so that the recording medium cartridge 30 is not pushed excessively into the slot 21 by the roller 63. The stopper 66 is fixed to the housing 10.

The spring member 67 is an elastic (resilient) member that biases (energizes) the arm member 60 so as to rotate it so that the recording medium cartridge 30 is pushed into the slot 21 by the roller 63 until the recording medium cartridge 30 is completely accommodated into the slot 21 when inserting the magazine 20 into the housing 10. Although the spring member 67 uses a torsion spring in FIGS. 8A and 8B, it may be another elastic member. The spring member 67 is supported to the spring supporting portion 68 at a coil-like portion where twisting occurs. As to the spring member 67, one end extending from the coil-like portion biases (urges) so as to press the force point portion 61, and other end extending from the coil-like portion is prevented from rotating by the spring rotation stopping portion 69. The spring supporting portion 68 is fixed to the housing 10 so as not to contact with the rotating arm member 60. The spring rotation stopping portion 69 is fixed to the housing 10 at a predetermined position away from the spring supporting portion 68.

The library device 1, in a control system like exemplary embodiment 2, has a control unit 40, a recording medium driver 11, an accessor 12, a magazine conveying mechanism 41, a latch releasing mechanism 42, a sensor 43, an operating unit 44 (see FIG. 5). Motion of the control system is the same as the motion of the control system of exemplary embodiment 2 except for the motion when ejecting the magazine.

As for the motion when ejecting the magazine, the control unit 40 controls the magazine conveying mechanism 41 so that the arm member 60 is rotated about the fulcrum pivot axis portion 62 as an pivotal axis (rotated clockwise when viewed in the state of FIGS. 10A and 10B) by moving the accessor 12 by a predetermined amount to be in contact with the contact portion 65 of the arm member 60 when ejecting of the magazine 20 from the housing 10 is operated by the user in the operating unit 44, and the roller 63 and the magazine 20 (including the recording medium cartridge 30) do not contact with each other (see FIGS. 8A, 8B, 10A and 10B), and then the magazine 20 is ejected from the housing 10. The controller 40 stops ejecting to the exterior of the housing 10 of the magazine 20 accommodating the recording medium cartridge 30 by stopping the ejecting motion of the magazine conveying mechanism 41 when detecting by the sensor 43 that the ejecting of the magazine 20 from the housing 10 is completed. The control unit 40 controls so as to rotate (rotate counterclockwise when viewed in FIGS. 10A and 10B) the arm member 60 so that the fulcrum pivot axis portion 62 constitutes a pivotal axis through biasing of the spring member 67, by moving the accessor 12 away from the contact portion 65 of the arm member 60 by a predetermined amount after stopping the ejecting motion of the magazine conveying mechanism 41, and causes the roller 63 to move to a position where it can contact with the magazine 20 and the recording medium cartridge 30.

Figure 11:
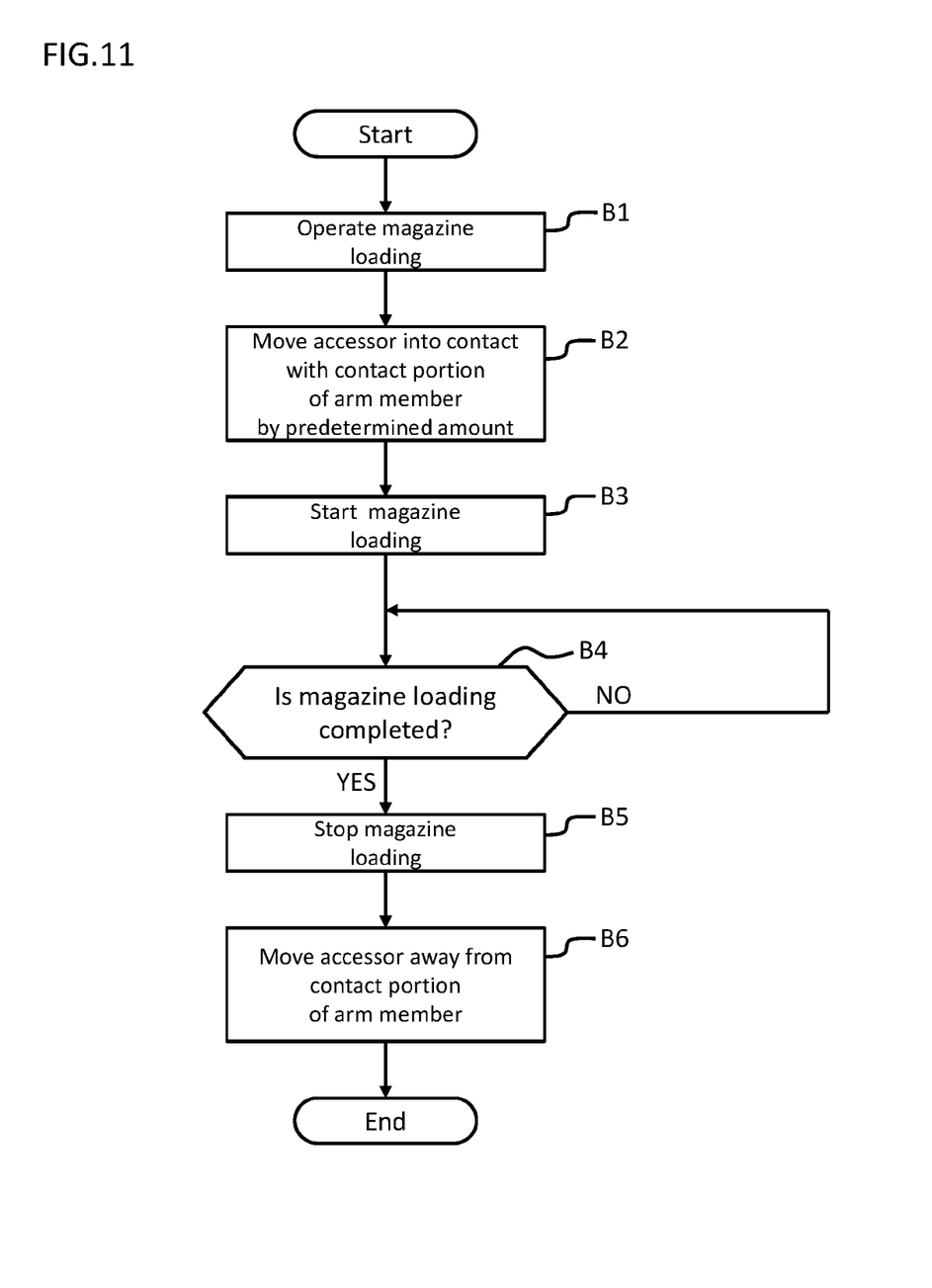
FIG. 11 is a flow chart schematically showing motions when ejecting the magazine of the library device according to exemplary embodiment 3.

Next, motions when ejecting the magazine of the library device according to exemplary embodiment 3 are explained using the drawings. FIG. 11 is a flow chart schematically showing motions when ejecting a magazine of a library device according to exemplary embodiment 3. As to configurations of the library device 1, please see FIGS. 1A to 6. The motions when loading the magazine is the same as those for exemplary embodiment 2 (see FIG. 7).

First, the library device 1 receives a magazine ejecting operation from the operating unit 44 by operation of the user in a state where the magazine 20 accommodating the recording medium cartridge 30 is accommodated in the housing 10 (Step B1).

After Step B1, the library device 1 rotates (rotates clockwise when viewed in FIGS. 10A and 10B) the arm member 60 so that the fulcrum pivot axis portion 62 constitutes a pivotal axis by moving the accessor 12 by a predetermined amount to contact with the contact portion 65 of the arm member 60, and prevents the roller 63 and the magazine 20 (including the recording medium cartridge 30) from contacting with each other (Step B2; see FIGS. 10A and 10B).

After Step B2, the library device 1 starts ejecting the magazine 20 accommodating the recording medium cartridge 30 to the exterior of the housing 10 by starting an ejecting motion of the magazine conveying mechanism 41 (Step B3).

After Step B3, the library device 1 confirms by sensor 43 whether or not the ejecting of the magazine 20 from the housing 10 is completed (Step B4). When the ejecting of the magazine 20 is not completed (NO in Step B4), return to Step B4.

When the ejecting of the magazine 20 is completed (YES in Step B4), the library device 1 stops the ejecting of the magazine 20 accommodating the recording medium cartridge 30 to the exterior of the housing 10 by stopping the ejecting motion of the magazine conveying mechanism 41 (Step B5).

After Step B5, the library device 1 rotates (rotates counterclockwise when viewed in the state of FIGS. 10A and 10B) the arm member 60 about the fulcrum pivot axis portion 62 as a pivotal axis due to a biasing force of the spring member 67 by moving the accessor 12 away from the contact portion 65 of the arm member 60 by a predetermined amount, and causes the roller 63 to move to a position where it can contact with the magazine 20 and the recording medium cartridge 30 (Step B6), and then comes to end.

According to exemplary embodiment 3, similarly to exemplary embodiment 2, even when the magazine 20 is loaded in the housing 10 in a state where the recording medium cartridge 30 does not jump out of the magazine 20 and the latch mechanism 15 is at an incomplete state, it is possible reliably to prevent the recording medium cartridge 30 from jumping out of the magazine 20. According to exemplary embodiment 3, the roller 63 and the magazine 20 (including the recording medium cartridge 30) do not contact with each other by moving the accessor 12 into contact with the contact portion 65 of the arm member 60 by a predetermined amount before the magazine starts ejecting, and the magazine 20 can be ejected smoothly.

APPENDIX

In the present invention, it is possible to take a form of the library device according to the first aspect.

In the library device according to the first aspect, it is preferable that the elastic (resilient) pushing mechanism is installed at an in/out-let of the magazine in the housing.

In the library device according to the first aspect, it is preferable that the elastic pushing mechanism comprises a spring (e.g. plate spring or torsion spring) which can push the recording medium cartridge into the slot until the recording medium cartridge is completely accommodated in the slot when the magazine is inserted into the housing.

In the library device according to the first aspect, it is preferable that the elastic (resilient) pushing mechanism further has a stopper which regulates a motion range of the plate spring, wherein the plate spring has a hook which can be caught by the stopper so as not to push the recording medium cartridge excessively into the slot, and wherein the stopper regulates deformation of the plate spring so as not to contact with the accessor.

In the library device according to the first aspect, it is preferable that the elastic pushing mechanism further has a lining member on a plane sliding to the recording medium cartridge in the plate spring.

In the library device according to the first aspect, it is preferable that the elastic pushing mechanism comprises: an arm member rotatably supported to the housing at a fulcrum; a roller rotatably supported to the arm member and being rotatable in contact with the recording medium cartridge; and a spring member having the arm member rotating so as to push the recording medium cartridge into the slot by the roller until the recording medium cartridge is completely accommodated in the slot when inserting the magazine into the housing.

In the library device according to the first aspect, it is preferable that the elastic pushing mechanism further comprises a stopper that regulates a motion range of the arm member so as not to push the recording medium cartridge excessively into the slot by the roller.

In the library device according to the first aspect, it is preferable that the library device further comprises: an operating unit that operates the ejecting of the magazine from the housing; a magazine conveying mechanism that convey the magazine in the housing; and a control unit that controls operations of the accessor and the magazine conveying mechanism; wherein the arm member has a contact portion which can contact with the accessor, and wherein the control unit controls so that the roller and the recording medium cartridge do not contact each other by having the accessor moving by a predetermined distance in contact with the contact portion when the ejecting of the magazine from the housing is operated in the operating unit, then, controls the magazine conveying mechanism so as to eject the magazine from the housing.

In the library device according to the first aspect, it is preferable that the elastic pushing mechanism is set so as not to contact at least the latch mechanism.

In the library device according to the first aspect, it is preferable that the roller is set so as not to contact the latch mechanism of the magazine.

In the library device according to the first aspect, it is preferable that the magazine further has a spring member that pushes the recording medium cartridge accommodated in the slot toward the in/out-let.

In the library device according to the first aspect, it is preferable that the library device further comprises a latch releasing mechanism that releases holding of the latch mechanism when ejecting the recording medium cartridge from the slot to the accessor.

In the present invention, it is possible to take a form of the cartridge jump-out preventing mechanism according to the second aspect.

In the present invention, it is possible to take a form of a method for preventing a cartridge from jumping out according to the third aspect.

The disclosures of the above mentioned Patent Literatures are to be incorporated herein by reference of the present document. Within the entire disclosure (including the Claims and Drawings) of the present invention, it is possible further to change or adjust the embodiment or example based on the basic technical thought. Also, within the entire disclosure of the present invention, various combinations or selections of various disclosed elements (including each element of each claim, each element of each embodiment or example, each element of each drawing, etc.) are possible. That is, it goes without saying that the present invention includes various modifications and revisions that can be made by one person skilled in the art according to the entire disclosure including claims and drawings and technical thought. Also, with respect to the numerical values and numerical ranges described in the present document, it is regarded that any intermediate value, subordinate numerical value and small range thereof are described even without specified disclosure.

What is claimed is:

1. A library device, comprising:
   a magazine having a plurality of slots for accommodating one or a plurality of recording medium cartridges to be able to be put in and out;
   a housing for accommodating the magazine to be able to be put in and out;
   a recording medium driver for reading or writing data of the recording medium cartridge;
   an accessor that is movable in a direction in which the plurality of slots are arranged and conveys the recording medium cartridge ejected from the slot to the recording medium driver; and
   a cartridge jump-out preventing mechanism for preventing the recording medium cartridge from jumping out of the slot into a moving path of the accessor;
   wherein the cartridge jump-out preventing mechanism comprises:
   an elastic pushing mechanism which is configured to push the recording medium cartridge into the slot by using an elastic force until the recording medium cartridge is completely accommodated in the slot when the magazine is inserted into the housing; and
   a latch mechanism which is disposed in the magazine and is configured to hold the recording medium cartridge so that the recording medium cartridge does not jump out of the slot when the recording medium cartridge is completely accommodated in the slot.

2. The library device according to claim 1,
   wherein the elastic pushing mechanism is installed at an in/out-let of the magazine in the housing.

3. The library device according to claim 1,
   wherein the elastic pushing mechanism comprises a spring member which is configured to push the recording medium cartridge into the slot until the recording medium cartridge is completely accommodated in the slot when the magazine is inserted into the housing.

4. The library device according to claim 3,
   wherein the elastic pushing mechanism further has a stopper which regulates a motion range of the spring member,
   wherein the spring member has a hook which is configured to be caught by the stopper so as not to push the recording medium cartridge excessively into the slot, and
   wherein the stopper regulates deformation of the spring member so as not to interfere with the accessor.

5. The library device according to claim 3,
   wherein the elastic pushing mechanism further has a lining member on a plane sliding to the recording medium cartridge in the spring member.

6. The library device according to claim 3,
   wherein the spring member comprises a plate spring.

7. The library device according to claim 1,
   wherein the elastic pushing mechanism comprises:
   an arm member rotatably supported to the housing at a fulcrum;
   a roller rotatably supported to the arm member and being rotatable in contact with the recording medium cartridge; and a spring member having the arm member rotating so as to push the recording medium cartridge into the slot by the roller until the recording medium cartridge is completely accommodated in the slot when inserting the magazine into the housing.

8. The library device according to claim 7,
wherein the elastic pushing mechanism further comprises a stopper that regulates a motion range of the arm member so as not to push the recording medium cartridge excessively into the slot by the roller.

9. The library device according to claim 7,
wherein the library device further comprises:
an operating unit that operates the ejecting of the magazine from the housing;
a magazine conveying mechanism that conveys the magazine within the housing; and
a control unit that controls operations of the accessor and the magazine conveying mechanism;
wherein the arm member has a contact portion which is configured to contact with the accessor, and
wherein the control unit controls so that the roller and the recording medium cartridge do not contact each other by causing the accessor to move by a predetermined distance in contact with the contact portion when ejecting of the magazine from the housing is operated in the operating unit, then, controls the magazine conveying mechanism so as to eject the magazine from the housing.

10. The library device according to claim 1,
wherein the recording medium driver comprises a magnetic tape driver.

11. The library device according to claim 1,
wherein the elastic pushing mechanism is set so as not to contact at least the latch mechanism.

12. The library device according to claim 7,
wherein the roller is set so as not to contact the latch mechanism of the magazine.

13. The library device according to claim 1,
wherein the magazine further has a spring member that pushes the recording medium cartridge accommodated in the slot toward the in/out-let.

14. The library device according to claim 1,
wherein the library device further comprises a latch releasing mechanism that releases holding of the latch mechanism when ejecting the recording medium cartridge from the slot to the accessor.

15. The library device according to claim 4,
wherein the stopper is integral with the housing.

16. The library device according to claim 4,
wherein the stopper has a protrusion for regulating deformation of the spring member so as not to contact with the accessor.

17. The library device according to claim 4,
wherein the stopper restricts movement of the hook of the spring member so that the spring member does not push the recording medium cartridge excessively into the slot.

18. The library device according to claim 5,
wherein the lining member comprises a material having a smaller friction coefficient than a material used for the spring member.

19. A cartridge jump-out preventing mechanism, comprising:
an elastic pushing mechanism which is configured to push a recording medium cartridge into a slot of a magazine by using an elastic force until the recording medium cartridge is completely accommodated in the slot when the magazine being in a state where the recording medium cartridge is accommodated in the slot of the magazine is inserted into a housing; and
a latch mechanism which is configured to hold the recording medium cartridge so that the recording medium cartridge does not jump out of the slot when the recording medium cartridge is completely accommodated in the slot.

20. A method for preventing a cartridge from jumping out, comprising;
pushing a recording medium cartridge into a slot of a magazine by using an elastic force until the recording medium cartridge is completely accommodated in the slot when the magazine being in a state where the recording medium cartridge is accommodated in the slot of the magazine is inserted into a housing; and
holding the recording medium cartridge so that the recording medium cartridge does not jump out of the slot when the recording medium cartridge is completely accommodated in the slot.

* * * * *